US009584420B2

United States Patent
Mena de la Cruz et al.

(10) Patent No.: US 9,584,420 B2
(45) Date of Patent: Feb. 28, 2017

(54) SWITCHING BETWEEN LOSS-BASED AND DELAY-BASED MODE FOR REAL-TIME MEDIA CONGESTION CONTROLLERS

(71) Applicant: Cisco Technology, Inc., San Jose, CA (US)

(72) Inventors: Sergio Mena de la Cruz, Etoy (CH); Stefano D'Aronco, Chavannes-pres-Renens (CH); Xiaoqing Zhu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 61 days.

(21) Appl. No.: 14/707,213

(22) Filed: May 8, 2015

(65) Prior Publication Data

US 2016/0330123 A1 Nov. 10, 2016

(51) Int. Cl.
*H04L 12/803* (2013.01)
*H04L 12/801* (2013.01)
*H04L 12/26* (2006.01)

(52) U.S. Cl.
CPC .......... *H04L 47/12* (2013.01); *H04L 43/0864* (2013.01); *H04L 47/11* (2013.01); *H04L 47/18* (2013.01)

(58) Field of Classification Search
None
See application file for complete search history.

(56) References Cited

U.S. PATENT DOCUMENTS

| | | | | |
|---|---|---|---|---|
| 5,367,523 A * | 11/1994 | Chang | ..................... | H04L 47/10 370/235 |
| 6,965,943 B1 * | 11/2005 | Golestani | ................ | H04L 47/10 370/232 |
| 8,687,498 B2 * | 4/2014 | Imai | ..................... | H04L 41/5019 370/229 |
| 2002/0181494 A1 * | 12/2002 | Rhee | ....................... | H04L 29/06 370/465 |
| 2005/0018617 A1 * | 1/2005 | Jin | .......................... | H04L 47/10 370/252 |
| 2005/0152397 A1 * | 7/2005 | Bai | ........................ | H04L 1/1887 370/468 |
| 2006/0050640 A1 * | 3/2006 | Jin | .......................... | H04L 47/10 370/235 |
| 2009/0019505 A1 * | 1/2009 | Gopalakrishnan | .... | H04L 1/0001 725/109 |

(Continued)

OTHER PUBLICATIONS

S. Floyd et al., "The NewReno Modification to TCP's Fast Recovery Algorithm," Network Working Group, Request for Comments: 2582, Apr. 1999, 12 pgs.

(Continued)

*Primary Examiner* — Brian Roberts
(74) *Attorney, Agent, or Firm* — Merchant & Gould P.C.

(57) ABSTRACT

Congestion control may be provided. A set of rules may allow a congestion control process to switch from delay-mode to loss-mode (e.g., in the presence of loss-based flows) and back to delay-mode (e.g., when loss-based flows stop). Fairness properties of this set of rules may include that the resulting flows may be fair to each other and the flows may also be fair when competing with loss-based flows. Many flows that may be deadlocked in loss-mode (e.g., in the absence of other genuine loss-based flows) may be helped to switch back to delay-mode.

20 Claims, 3 Drawing Sheets

(56) References Cited

U.S. PATENT DOCUMENTS

| | | | | |
|---|---|---|---|---|
| 2013/0083656 A1* | 4/2013 | Wigell | ............... | H04L 47/12 370/230 |
| 2015/0295827 A1* | 10/2015 | Zhu | ............... | H04L 47/12 370/230 |

OTHER PUBLICATIONS

S. Floyd et al., "TCP Friendly Rate Control (TFRC) : Protocol Specification," Network Working Group, Request for Comments: 5348, Sep. 2008, 58 pgs.

J. Gettys et al., "Bufferbloat: Dark Buffers in the Internet," ACM Queue, vol. 9, Issue 11, Nov. 2011, pp. 1-15.

S. Shalunov et al., "Low Extra Delay Background Transport (LEDBAT)," RFC: 6817, Dec. 2012, 26 pgs.

X. Zhu et al., "NADA: A Unified Congestion Control Scheme for Real-Time Media," draft-zhu-rmcat-nada-00, Network Working Group, Internet Draft, Cisco Systems, Oct. 14, 2012, 11 pgs.

X. Zhu et al., "NADA: A Unified Congestion Control Scheme for Low-Latency Interactive Video," Cisco Systems, Inc., Jul. 22, 2013 (CPOL), 8 pgs.

H. Lundin et al., "A Google Congestion Control Algorithm for Real-Time Communication on the World Wide Web," draft-alvestrand-rtcweb-congestion-01, Network Working Group, Internet Draft, Oct. 29, 2011, 19 pgs.

L. Budzisz et al., "On the Fair Coexistence of Loss- and Delay-Based TCP," IEEE/ACM Transactions on Networking, vol. 19, No. 6, Dec. 2011, pp. 1811-1824.

FP Kelly et al., "Rate control for communication networks: shadow prices, proportional fairness and stability," Journal of the Operational Research Society, 1998, vol. 49, pp. 237-252.

S. Floyd et al., "Equation-Based Congestion Control for Unicast Applications," International Computer Science Institute (ICSI), ACM SIGCOMM, vol. 30, No. 4, Feb. 9, 2000, pp. 1-18.

K. Ramakrishnan et al., "The Addition of Explicit Congestion Notification (ECN) to IP," Network Working Group, Request for Comments: 3168, Sep. 2001, 64 pgs.

\* cited by examiner

SWITCHING BETWEEN LOSS-BASED AND DELAY-BASED MODE FOR REAL-TIME MEDIA CONGESTION CONTROLLERS

TECHNICAL FIELD

The present disclosure relates generally to data congestion control.

BACKGROUND

In data networking and queueing theory, network congestion occurs when a link or node is carrying so much data that its quality of service deteriorates. Typical effects include queueing delay, packet loss, or the blocking of new connections. A consequence of the latter two is that an incremental increase in offered load leads either only to a small increase in network throughput, or to an actual reduction in network throughput.

Network protocols that use aggressive retransmissions to compensate for packet loss tend to keep systems in a state of network congestion, even after the initial load has been reduced to a level which would not normally have induced network congestion. Thus, networks using these protocols can exhibit two stable states under the same level of load. The stable state with low throughput is known as congestive collapse.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
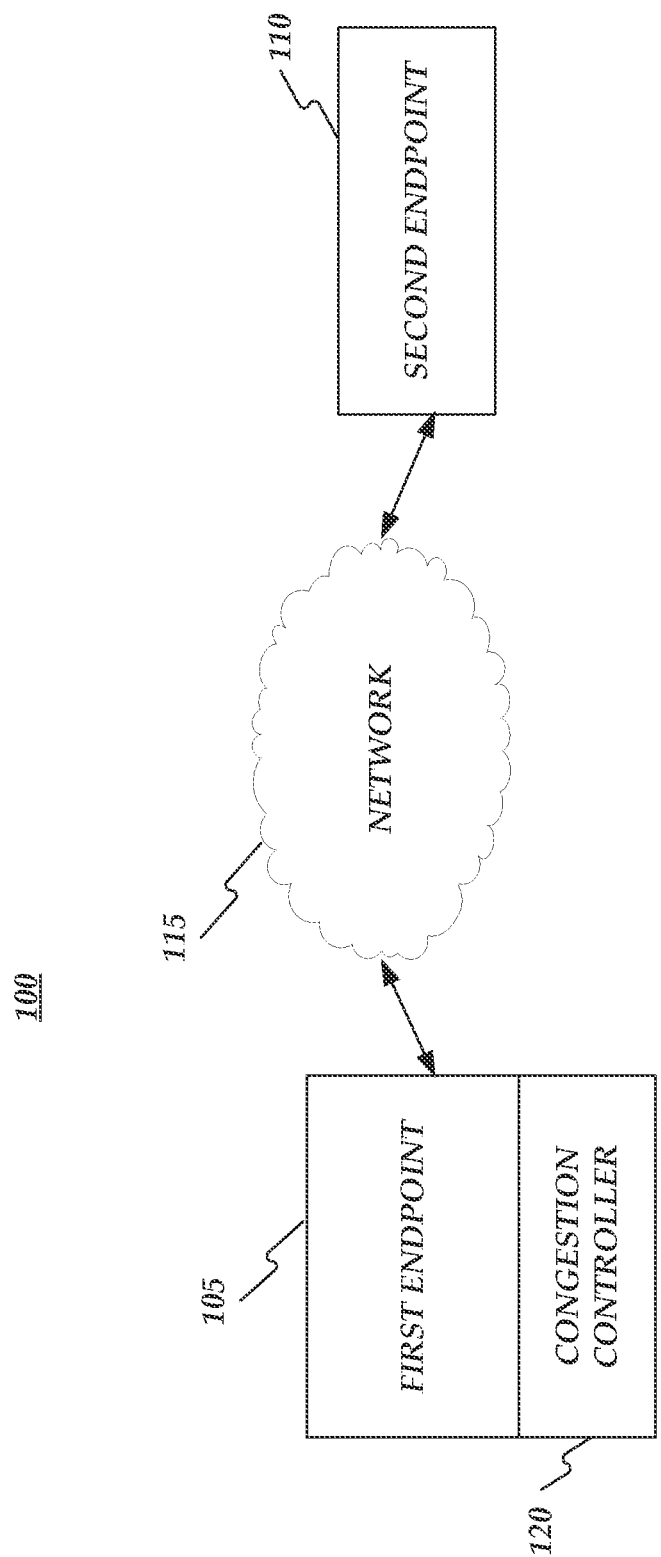
FIG. 1 is a block diagram of an operating environment for providing congestion control in accordance with at least one example embodiment.

Congestion control may be provided. A set of rules may allow a congestion control process to switch from delay-mode to loss-mode (e.g., in the presence of loss-based flows) and back to delay-mode (e.g., when loss-based flows stop). Fairness properties of this set of rules may include that the resulting flows may be fair to each other and the flows may also be fair when competing with loss-based flows. Many flows that may be deadlocked in loss-mode (e.g., in the absence of other genuine loss-based flows) may be helped to switch back to delay-mode.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

There are two types of congestion controls for networks (e.g., the internet), loss-based and delay-based. Embodiments of the disclosure may focus on delay-based congestion control processes for real-time media flows. Congestion control processes in the Internet, for example, have traditionally been based on loss information. An example is Transmission Control Protocol (TCP)'s congestion control process, which halves its sending window when a loss is detected. Over the years, this generation of processes has helped preserve the Internet from a congestion collapse. Loss-based congestion control processes may be well suited for a number of applications (e.g., remote terminal, backup transfer, web browsing, email, etc.). However, they may not be well suited for applications that deal with real-time media (e.g., video conferencing, video streaming, etc.). These applications may be particularly sensitive to the experienced end-to-end delay and jitter. So, in network conditions with sizeable tail-drop buffers (e.g., Internet Service Providers ISPs with bufferbloat), by the time packet losses start to occur, the end-to-end delay may have already grown beyond acceptable levels, negatively affecting network users' quality of experience (QoE).

Some congestion control processes focus their operation on delay feedback. Delay feedback may allow these processes to properly react to changing network conditions, even before any loss occurs. Delay-based processes may thus be better than loss-based processes at keeping end-to-end delay and round-trip time (RTT) at acceptable levels in real-time media transmission for example.

One problem to solve with delay-based congestion control processes is that delay-based flows tend to obtain far less than their fair share of available network bandwidth when competing, for example, with loss-based flows. In some cases, delay-based flows may starve. One reason for this may be that delay-based controllers may be more sensitive to congestion than loss-based controllers. Therefore, embodiments of the disclosure may be directed toward allowing delay-based flows to work properly (e.g., to obtain their fair share of the bandwidth) in the presence of loss-based flows (e.g., TCP, TCP-Friendly Rate Control (TFRC)). In other words, embodiments of the disclosure may address the fairness/starvation problem of delay-based flows when they compete with loss-based flows.

Some delay-based processes compete with loss-based flows in an ad-hoc way. For instance, these delay-based processes treat loss information in the following way: a lost packet is considered to have arrived, but with an end-to-end delay of 1s. However, even if these delay-based processes do not starve in the presence of TCP flows, they are not guaranteed to have a fair share of the bottleneck network bandwidth.

Another example of delay-based processes that compete with loss-based flows are ones that use the difference between a sending rate and a receiving rate to detect when network buffers start growing. In this example, if the sending rate is greater than the receiving rate for a while, then the packets that account for the difference are piling up some-where in the network. However, if network buffers are very short and losses occur, these losses may also be reflected in the sending-receiving rate difference.

Another congestion control process may have two different processes to compute the sending rate; one may be based on observed losses and the other may be based on measured delay. TFRC's throughput equation may be used in order to set a lower bound on the sending rate of the flow when losses are experienced. However, this process may not make a distinction between loss-based and delay-based mode.

The aforementioned example delay-based processes may address losses in an ad-hoc way (i.e., different each time). They may not allow a pair of existing delay-based and loss-based processes to work properly (e.g., to obtain their fair share of the bandwidth) in both the presence and absence of loss-based flows like TCP for example. Embodiments of the disclosure may allow delay-based congestion control processes to switch from their (natural) delay-based mode to a loss-based mode when they realize they are competing with loss-based flows like TCP for example.

FIG. 1 is a block diagram of an operating environment 100 in accordance with embodiments of the disclosure. As shown in FIG. 1, operating environment 100 may comprise a first endpoint 105, a second endpoint 110, and a network 115. Each of first endpoint 105 and second endpoint 110 may comprise a communication terminal that may comprise, but is not limited to, a set-top box (STB), a digital video recorder, a cable modem, a personal computer, a Wi-Fi access point, a cellular base station, a switch servicing multiple clients in a vicinity, a tablet device, a mobile device, a smart phone, a telephone, a remote control device, a network computer, a mainframe, a router, or other similar device. Network 115 may comprise any type of network (e.g., the Internet, a hybrid fiber-coaxial (HFC) network, a content delivery network (CDN), etc.).

As shown in FIG. 1, first endpoint 105 may include a congestion controller 120. While FIG. 1 shows congestion controller 120 in first endpoint 105, congestion controller 120 is not limited to this location and may be disposed in second endpoint 110, network 115, on anywhere else. Congestion controller 120 is described in greater detail below with respect to FIG. 2 and FIG. 3.

Consistent with embodiments of the disclosure, first endpoint 105 may send a flow (e.g., a one-to-one real-time media transmission) to second endpoint 110 by shipping the output coming from, for example, its video codec into UDP packets (e.g., RTP). The rate at which first endpoint 105 sends media at time t may be denoted by x(t) (e.g., target sending rate). Congestion controller 120 may implement a delay-based congestion control process that sets the target sending rate for first endpoint 105's codec. The target sending rate may be based on previous values of the sending rate, as well as on feedback (e.g., feedback packets) received by congestion controller 120 from second endpoint 110. An update of the target sending rate may be performed, for example, every p seconds, where p may be a fixed update period (e.g., 0.01 s). First endpoint 105 may have a "perfect" codec that may be able to output the rate set by congestion controller 120. Embodiments of the disclosure may also be implemented where no codec is involved (e.g., general bulk DCCP-like data transfers where data reliability may not be required). The direction of the flow may be from second endpoint 110 to first endpoint 105 consistent with embodiments of the disclosure. Moreover, first endpoint 105 and second endpoint 110 may act simultaneously as sender and receiver, which may represent two symmetric instances of the same process as described below.

The utility of a flow, denoted with U(x), may be a measure of the satisfaction that a user gets when data is transmitted at bitrate x. A fundamental requirement for a utility function, for example, may be an increasing concave function of the rate. When dealing with media flows, a video/audio quality metric of the media sequence may be used as utility function since these metrics may match the characteristics needed by the general definition of utility. For example, U(x) may comprise, but is not limited to, log(x).

The goal of a (distributed) congestion control process, whether loss-based or delay-based, may be to maximize the overall utility of all media flows between sender-receiver pairs (e.g., first endpoint 105 and second endpoint 110) in a network (e.g., network 115), while respecting the bandwidth of all network links. Achieving the utility maximization of all flows in the network may guarantee a fair distribution of bandwidth of the bottleneck links among the flows that traverse them.

Congestion control processes can be modeled using a utility maximization framework. Using the framework may simplify the explanation of the dynamics of congestion control processes. Under this framework, a congestion control process governing each flow may be expressed as the interaction of two values acting as two opposite "forces": i) an uplifting force; and ii) a pulling down force. The uplifting force may try to maximize the utility of the flow. The uplifting force may be the derivative of the utility function U'(x), which equals 1/x for U(x)=log(x). The pulling down force (i.e., price function or price (t)) may be a force that may pull the sending rate down to prevent, for example, the rate from overshooting the network. This function may evolve over time. More importantly, the price function may be based on various feedback types: if it is based on packet losses, then the overall congestion controller may be a loss-based process; if it is based on packet delay, then the congestion controller may be a delay-based process. Finally, a hybrid price function may be based on a combination of delay, loss, as well as other indicators.

The interaction of these two forces (e.g., the uplifting force and the pulling down force), which may occur for each flow, may be the core of the aforementioned framework. The following process may describe it. At every update period p, execute:

$t = \text{get\_current\_time}(\ )$ $x\_\text{old} = x(t-p)$ $x(t) = x\_\text{old} + k * x\_\text{old} * [U'(x\_\text{old}) - \text{price}(t-p)]$ (Eq. 1)

where U'(x_old) may comprise the uplifting force, price(t−p) may comprise the pulling down force, and k may comprise a gain factor that determines how fast the process reacts to changing network conditions.

At equilibrium, these two forces (e.g., the uplifting force and the pulling down force) may cancel each other out at a bitrate that maximizes the utility of the flow (uplifting force), while it takes into account the capacity of the links traversed and the traffic generated by conflicting flows (price function, pulling down). Note the aforementioned framework may comprise an example of a congestion control process in order to better describe the difference between loss-based and delay-based processes. Embodiments of the disclosure may also be applied to processes that may not be formulated in terms of the aforementioned framework.

Embodiments of the disclosure may be applicable to any pair of delay-based and loss-based congestion control processes. For example, a pair of congestion control processes, D (delay-based) and L (loss-based), which can be expressed in terms of the aforementioned framework, may be used. Accordingly, the main difference between the pair of congestion control processes (D and L) is that they may use delay and loss information, respectively, for their price function. As D is delay-based, its price function may depend on the experienced one-way delay (OWD) or round trip time (RTT):

$$price\_D(t)=f1(OWD,RTT) \qquad (Eq. 2)$$

As L is loss-based, its price function may depend on packet loss or marking information:

$$price\_L(t)=f2(losses,marking) \qquad (Eq. 3)$$

In this example, f1 and f2 may comprise functions such that, if we substitute price (t−p) in Eq. (1) by price_D(t−p), resp. price_L(t−p), defined in Eq. (2), resp. (3), we may obtain the complete process D, resp. L.

Embodiments of the disclosure may include two modes of operation: delay mode and loss mode. Consistent with embodiments of the disclosure, the congestion control process of a flow F (e.g., from first endpoint 105 to second endpoint 110) may activate the delay mode (e.g., the default) when no loss-based flows (such as TCP) are present in any of the links used by flow F. In turn, the congestion control process may switch to loss mode if there is evidence that loss-based flows are competing for bandwidth consistent with embodiments of the disclosure. The goal of switching to the loss mode may be to ensure that flow F may obtain a fair share of the bandwidth available. This may result because competing loss-based flows may reduce their sending rate or sending window aggressively when they detect losses; for instance, TCP may halve its sending window when it detects losses.

As processes D and L may be expressed in terms of the aforementioned framework, we may take the formula as it appears in Eq. (1) and only modify the price function. The price function may be extended to express both the delay and loss modes. The extended price function may be a linear combination of Eq. (2) and Eq. (3):

$$extended\_price(t)=w*price\_D(t)+gamma*(1-w)* \\ price\_L(t) \qquad (Eq. 4)$$

where:
- w may be a value between [0 . . . 1] and may represent the weight given to the delay mode. 1−w may represent the weight given to the loss mode. w may vary over time;
- price_D(t) may be the delay-based price function defined in Eq. (2) and may be used when in delay mode;
- price_L(t) may be the loss-based price function defined in Eq. (3) and may be used when in loss mode; and
- gamma may be a constant scaling factor. Its value may be consistent with the chosen utility function U(x), so that the rate at equilibrium ensures it is fair with respect to coexisting loss-based (e.g., TCP) flows.

One key to make this equation work may be to figure out how to control the value of w. Before describing a process governing the value of w, some definitions may be described:
- unclipped_threshold(t)=(QD(t−p . . . t)−g(x(t))/QD (t−p . . . t))
- threshold(t)=min(0,max(0.6,unclipped_thresh(t)))
- time_full(t) may be computed as the time QD has been greater than alpha* QD_max. time_full may be updated at the end of each update period p, and its value may be greater than p.
where:

- QD may be the average one way queuing delay experienced by packets sent from first endpoint 105 to second endpoint 110, according to second endpoint's feedback, during the last update interval p;
- QD_max may be the maximum one way queuing delay experienced by the flow so far;
- g(x(t)) may be equal to the experienced queuing delay at equilibrium if the flow was working in delay mode (w=1) with sending rate x(t); and
- alpha and beta (used below) may be parameters that may be set between 0.5 and 1, with alpha>beta. For example, alpha and beta may be set to 0.9 and 0.8 respectively.

Figure 2:
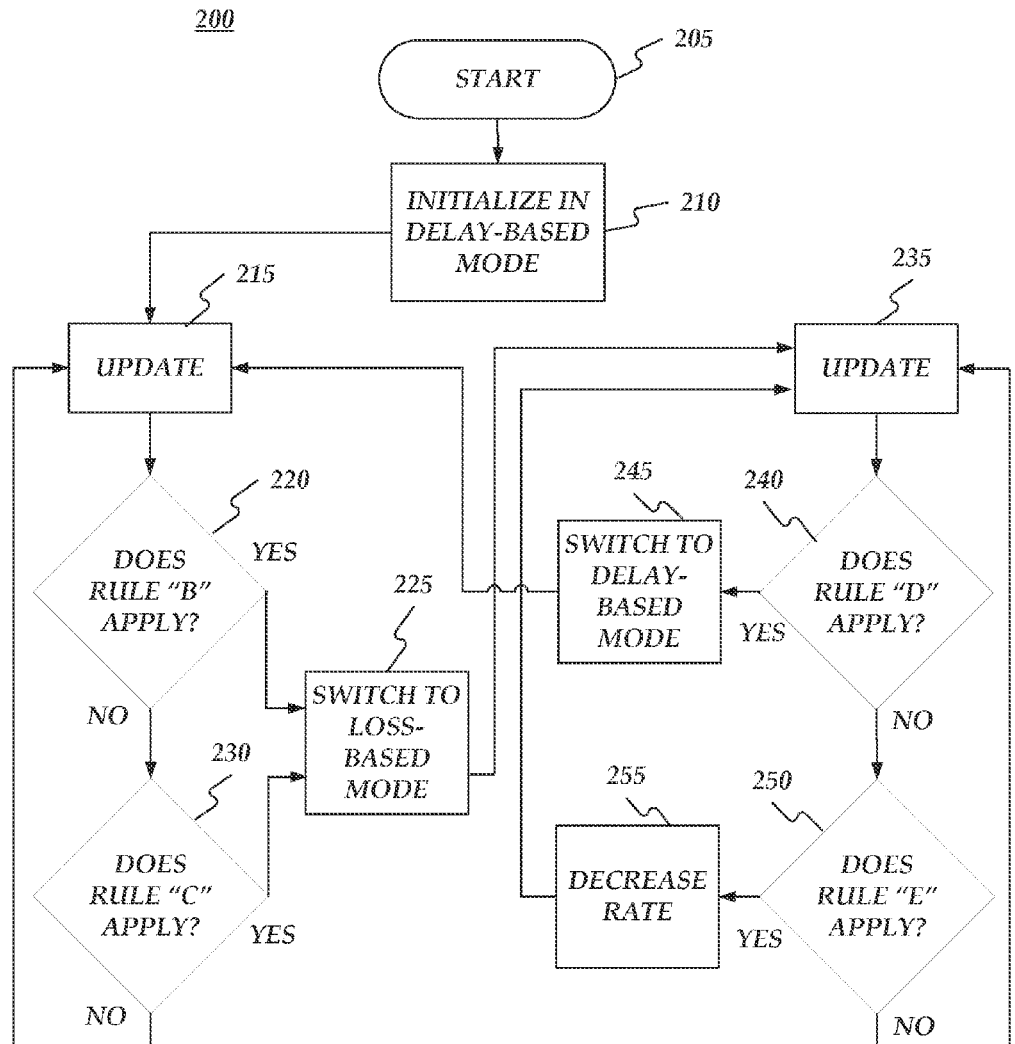
FIG. 2 is a flow chart of a method for providing congestion control in accordance with at least one example embodiment.

FIG. 2 is a flow chart setting forth the general operations involved in a method 200 consistent with embodiments of the disclosure for providing congestion control, for example, for the flow being sent from first endpoint 105 to second endpoint 110 over network 115. Method 200 may be implemented using congestion controller 120 as described above with respect to FIG. 1. Congestion controller 120 may be embodied, for example, in a computing device 300 as described in more detail below with respect to FIG. 3. Ways to implement the operations of method 200 will be described in greater detail below.

Consistent with embodiments of the disclosure, method 200 may disclose how to switch from loss-mode to delay-mode and vice versa, by periodically updating the value of w in, for example, Eq. (4) within the example framework as described above though embodiments of the disclosure are not limited to the above described framework. If loss-based flows are present (e.g., TCP), these loss-based flows may try to fill the available bandwidth relatively quickly. If this is not happening, then embodiments of the disclosure may switch to delay-mode.

At the end of each periodic update interval p (i.e., when the rate equation is updated), consistent with embodiments of the disclosure, method 200 may update the value of w according to the following five rules:

Rule A—(start) w=1 initially;
Rule B—(switch from delay-based to loss-based) if losses were experienced in the last update interval p, then w=0;
Rule C—(switch from delay-base to loss) if QD>alpha*QD_max, then w=max(w−p/T_w, 0);
Rule D—(switch from loss-based to delay-based) if QD<beta*QD_max, or i_last>8*i_avg, then w=min (w+p/T_w, 1); and
Rule E—(switch from loss-based to delay-based) if QD>beta*QD_max, and w<0.8, and time_full(t)>5 secs, and rand(1)<threshold(t), then x(t)=0.95*x(t),
where:
- i_last may be the number of packets received since the last packet loss;
- i_avg may be the average number of packets received between two packet losses in a time period (e.g., the last 30 seconds);
- rand(1) may be a random number between [0 . . . 1];
- T_w may be the time that the process takes to transition from loss to delay mode and vice versa for rules (C) and (D); and
- T_w may be chosen long enough so that loss-based flows in network 115 to have time to fill the bottleneck buffer and abort any transition to delay mode. For example, T_w's value may be set to 5 seconds.

Method 200 may begin at starting block 205 and proceed to stage 210 where congestion controller 120 may initialize its operation in a delay-based mode (e.g., rule "A"). For example, the congestion process may start in the delay-based mode by setting w=1 in the above described framework.

Once congestion controller 120 initializes its operation in the delay-based mode in stage 210, method 200 may continue to stage 215 where congestion controller 120 may receive an update from second endpoint 110 and recalculate w. For example, an update of the target sending rate may be performed, for example, every p seconds, where p may be a fixed update period (e.g., 0.01 s).

From stage 215, where congestion controller 120 receives an update from second endpoint 110, method 200 may advance to stage 220 where congestion controller 120 may determine if rule "B" applies. If congestion controller 120 determines that rule "B" does apply in stage 220, method 200 may continue to stage 225 where congestion controller 120 may switch to the loss-based mode. For example, if losses were experienced in the last update interval p, then w=0. Consequently, the congestion control may be switched from delay-based to loss-based as described above with respect to the aforementioned framework.

If congestion controller 120 determines, however, that rule "B" does not apply in stage 220 (e.g., no losses were experienced in the last update interval p), method 200 may continue to stage 230 where congestion controller 120 may determine if rule "C" applies. For example, controller 120 may determine if QD>alpha*QD_max as described above with respect to the aforementioned framework. If congestion controller 120 determines that rule "C" does not apply in stage 230, method 200 may continue to stage 215 where congestion controller 120 may receive an update from second endpoint 110. For example, an update of the target sending rate may be performed, for example, every p seconds, where p may be a fixed update period (e.g., 0.01 s).

If congestion controller 120 determines, however, that rule "C" does apply in stage 230, method 200 may continue to stage 225 where congestion controller 120 may switch to a loss-based mode. The transition to the loss-based mode in this case may not be instantaneous (unlike for rule "B" above that may be instantaneous). In this case the transition may take happen over a period of time, for instance, 5 s. For example, if QD>alpha*QD_max, then w=max(w−p/T_w, 0). Consequently, the congestion control may be switched from delay-based to loss-based as described above with respect to the aforementioned framework.

After congestion controller 120 switches to the loss-based mode in stage 225, method 200 may proceed to stage 235 where congestion controller 120 may receive an update from second endpoint 110. For example, an update of the target sending rate may be performed, for example, every p seconds, where p may be a fixed update period (e.g., 0.01 s).

From stage 235, where congestion controller 120 receives an update from second endpoint 110, method 200 may advance to stage 240 where congestion controller 120 may determine if rule "D" applies. If congestion controller 120 determines that rule "D" does apply in stage 240, method 200 may continue to stage 245 where congestion controller 120 may switch to the delay-based mode. For example, if QD<beta*QD_max, or i_last>8*Lavg, then w=min(w+p/T_w, 1). Consequently, the congestion control may be switched from loss-based to delay-based as described above with respect to the aforementioned framework.

After congestion controller 120 switches to the delay-based mode in stage 245, method 200 may proceed to stage 215 where congestion controller 120 may receive an update from second endpoint 110. For example, an update of the target sending rate may be performed, for example, every p seconds, where p may be a fixed update period (e.g., 0.01 s).

If congestion controller 120 determines, however, that rule "D" does not apply in stage 240, method 200 may continue to stage 250 where congestion controller 120 may determine if rule "E" applies. If congestion controller 120 determines that rule "E" does not apply in stage 250, method 200 may continue to stage 235 where congestion controller 120 may receive an update from second endpoint 110. For example, an update of the target sending rate may be performed, for example, every p seconds, where p may be a fixed update period (e.g., 0.01 s).

If congestion controller 120 determines, however, that rule "E" does apply in stage 250, method 200 may continue to stage 255 where congestion controller 120 may decrease the rate. For example, if QD>beta*QD_max, and w<0.8, and time_full(t)>5 secs, and rand(1)<threshold(t), then x(t)= 0.95*x(t). Consequently, the congestion control may decrease the rate x(t).

After congestion controller 120 decreases the rate x(t) in stage 255, method 200 may proceed to stage 235 where congestion controller 120 may receive an update from second endpoint 110. For example, an update of the target sending rate may be performed, for example, every p seconds, where p may be a fixed update period (e.g., 0.01 s). The aforementioned process 200 described above with respect to FIG. 2 may continue, for example, as long as flow F is being sent from first endpoint 105 to second endpoint 110.

The above rules may allow the congestion control process to properly switch from delay-mode to loss-mode when loss-based flows start to send data, because the latter may increase network 115's queues (rule C) and possibly cause losses (rule B); and back to delay-mode when the loss-based flows stop sending data sharply, because their sharp stop may cause network 115's queues to decrease (rule D), which may prevent losses for a long-enough transition period.

However, if the loss-based flows stop sending data slowly, there may be a risk that the length decrease in network 115's queues that rule D uses to switch back to delay-mode does not take place. In this case, there might be a number of flows that may be deadlocked in loss-mode, even if all of them could theoretically switch to delay-mode. They stay in loss-mode because they may be experiencing losses triggered by the other flows' loss-mode behavior (as well as their own).

To solve this problem, embodiments of the disclosure may slightly decrease the flows' sending rate in a coordinated manner. The goal of these coordinated slight rate decreases may be to achieve the cumulative effect of decreasing the network queues long enough for rule D to kick in. Rule E may implement such coordinated rate decreases.

The random component "rand(1)<threshold(t)" of rule E may create small random "valleys" in the experienced queueing delay. These small "delay valleys" may be experienced in the same way by all flows sharing the same bottleneck, and may thus be used as a synchronization point to induce bigger "delay valleys". This may be the role of component "time_full(t)>5 secs" of rule E, which may cause some flows to create their valleys at the same time: exactly 5 seconds after a small random valley occurred. (While 5 seconds is used in this example, other time periods may be used.) This synchronized valley may be much bigger, as it is the result of many flows decreasing their sending rate by 5%. If there is currently no loss-based flow, the length of the induced valley may be large enough to allow a switch to delay-mode, for example, by rule D.

Consistent with embodiments of the disclosure, a congestion control process may be provided by combining a loss-based and a delay-based congestion control process as described above, for example, with respect to Eq. (4), and using rules A through E to control the value of w. Such a congestion control process may be fair with itself when operating in delay-mode, and may be fair with both itself and existing loss-based flows when operating in loss mode.

In the presence of bufferbloat and loss-based flows, embodiments of the disclosure may still work in the sense that it may obtain its fair share of the bandwidth. However, as loss-based flows overshoot the bufferbloated network until they face losses, the average delay at equilibrium may likely be unacceptable for real-time applications. Nevertheless, the decision on whether experienced delay is still acceptable can be left up to the user. If the user deems the delay acceptable, the user may be able to operate with a fair share of the bandwidth.

Figure 3:
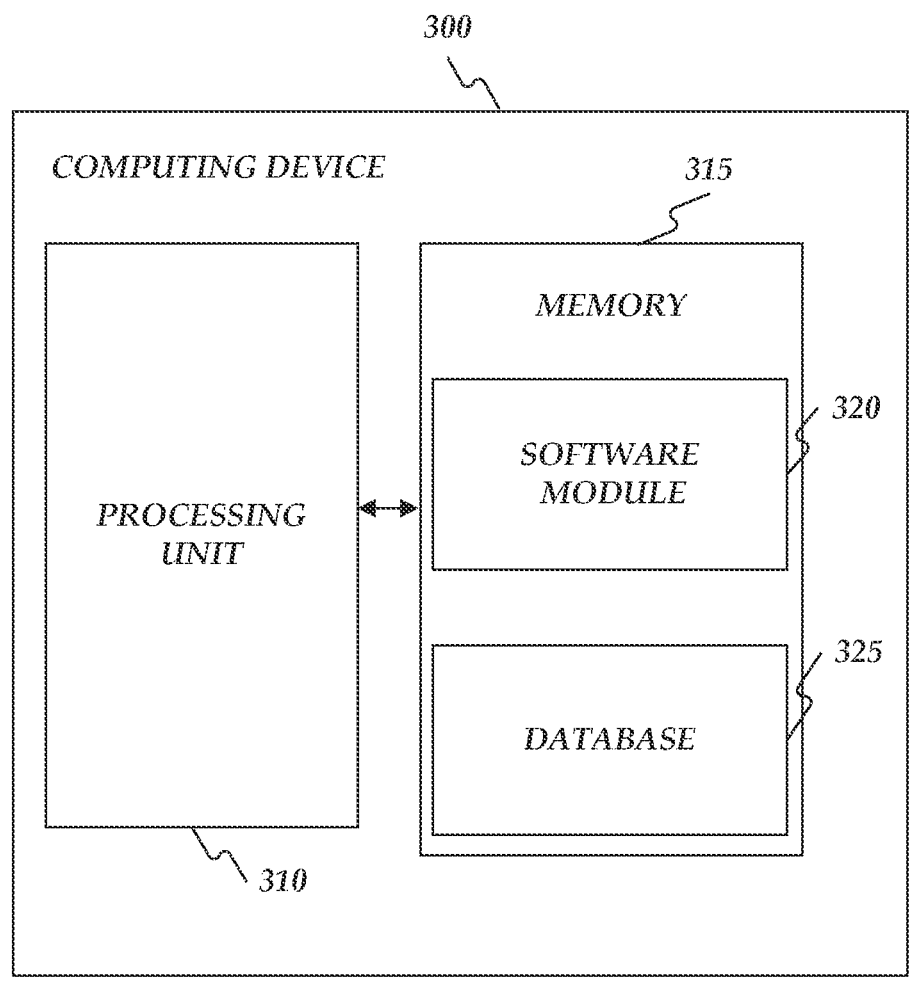
FIG. 3 is a block diagram of a computing device in accordance with at least one example embodiment.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing congestion control, including for example, any one or more of the stages from method 200 described above with respect to FIG. 2. Computing device 300, for example, may provide an operating environment for congestion controller 120. Congestion controller 120 may operate in other environments and is not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. Furthermore, computing device 300 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   initializing a weighting factor;
   sending a flow from a first endpoint to a second endpoint at a target sending rate being a function of an extended price function, the extended price function being a function of the weighting factor, a delay-based price function, and a loss-based price function wherein the weighting factor weights the effect of the delay-based price function and the loss-based price function on the extended price function; and
   periodically updating, at an interval, the weighting factor and the target sending rate at which the flow is being sent to the second endpoint based on the updated weighting factor, a previous value of the target sending rate, and feedback received from the second endpoint.

2. The method of claim 1, wherein sending the flow from the first endpoint to the second endpoint at the target sending rate being a function of the extended price function comprises sending the flow wherein the extended price function comprises:

$$\text{extended\_price} = w * \text{price\_}D(t) + \text{gamma} * (1-w) * \text{price\_}L(t); \text{ where}$$

w is the weighting factor that varies between 0 and 1 inclusively,
   price_D(t) is the delay-based price function,
   price_L(t) is the loss-based price function, and
   gamma is a constant scaling factor.

3. The method of claim 2, wherein initializing the weighting factor comprises setting w=1.

4. The method of claim 2, wherein periodically updating comprises setting w=0 if losses were experienced by the flow during the last interval.

5. The method of claim 2, wherein periodically updating comprises setting w=max(w−p/T_w, 0), if, during the last interval, QD>alpha*QD_max, where:
   p is the interval,
   QD is the average one way queuing delay experienced by packets in the flow sent from the first endpoint to the second endpoint according to the feedback received from the second endpoint during the last update interval p,
   QD_max is the maximum one way queuing delay experienced by the flow so far,
   alpha is set between 0.5 and 1, and
   T_w is the time it takes to transition from loss-mode to delay-mode and vice versa.

6. The method of claim 2, wherein periodically updating comprises setting w=min(w+p/T_w, 1), if, during the last interval, QD<beta*QD_max or i_last>8*i_avg, where:
   p is the interval,
   QD is the average one way queuing delay experienced by packets in the flow sent from the first endpoint to the second endpoint according to the feedback received from the second endpoint during the last update interval p,
   QD_max is the maximum one way queuing delay experienced by the flow so far,
   beta is set between 0.5 and 1,
   T_w is the time it takes to transition from loss-mode to delay-mode and vice versa,
   i_last is a number of packets received by the second endpoint since a last packet loss based on the feedback received from the second endpoint, and
   i_avg is the average number of packets received between two packet losses by the second endpoint in a time period based on the feedback received from the second endpoint.

7. The method of claim 2, wherein periodically updating comprises setting x(t)=0.95*x(t), if, during the last interval, QD>beta*QD_max, w<0.8, time_full(t)>5 sec., and rand(1)<threshold(t), where:
   QD is the average one way queuing delay experienced by packets in the flow sent from the first endpoint to the second endpoint according to the feedback received from the second endpoint during the last update interval p,
   QD_max is the maximum one way queuing delay experienced by the flow so far,
   beta is set between 0.5 and 1,
   x(t) is the target sending rate, and
   rand(1) is a random number between [0 . . . 1].

8. The method of claim 1, wherein sending the flow from the first endpoint to the second endpoint at the target sending rate being a function of the extended price function, the extended price function being a function of the weighting factor, the delay-based price function, and the loss-based price function wherein the delay-based price function comprises price_D(t) being a function of at least one of the follow: one-way delay (OWD) experienced by the flow and round trip time (RTT) experienced by the flow.

9. The method of claim 1, wherein sending the flow from the first endpoint to the second endpoint at the target sending rate being a function of the extended price function, the extended price function being a function of the weighting factor, the delay-based price function, and the loss-based price function wherein the loss-based price function comprises price_L(t) being a function of at least one of the follow: packet loss in the flow and marking information in the flow.

10. The method of claim 1, wherein sending the flow comprises sending the flow comprising a one-to-one real-time media transmission.

11. An apparatus comprising:
    a memory storage; and
    a processing unit coupled to the memory storage, wherein the processing unit is operative to:
    initialize a weighting factor w, wherein initializing the weighting factor comprises setting w=1;
    send a flow from a first endpoint to a second endpoint at a target sending rate being a function of an extended price function, the extended price function being a function of the weighting factor, a delay-based price function, and a loss-based price function wherein the weighting factor weights the effect of the delay-based price function and the loss-based price function on the extended price function, wherein the extended price function comprises:

$$\text{extended\_price} = w * \text{price\_}D(t) + \text{gamma} * (1-w) * \text{price\_}L(t); \text{ where}$$

w is the weighting factor that varies between 0 and 1 inclusively,
price_D(t) is the delay-based price function,
price_L(t) is the loss-based price function, and
gamma is a constant scaling factor; and
periodically update, at an interval, the weighting factor and the target sending rate at which the flow is being sent to the second endpoint based on the updated weighting factor, a previous value of the target sending rate, and feedback received from the second endpoint.

12. The apparatus of claim 11, wherein the processing unit being operative to periodically update comprises the processing unit being operative to set w=0 if losses were experienced by the flow during the last interval.

13. The apparatus of claim 11, wherein the processing unit being operative to periodically update comprises the processing unit being operative to set w=max(w−p/T_w, 0), if, during the last interval, QD>alpha*QD_max, where:
p is the interval,
QD is the average one way queuing delay experienced by packets in the flow sent from the first endpoint to the second endpoint according to the feedback received from the second endpoint during the last update interval p,
QD_max is the maximum one way queuing delay experienced by the flow so far,
alpha is set between 0.5 and 1, and
T_w is the time it takes to transition from loss-mode to delay-mode and vice versa.

14. The apparatus of claim 11, wherein the processing unit being operative to periodically update comprises the processing unit being operative to set w=min(w+p/T_w, 1), if, during the last interval, QD<beta*QD_max or i_last>8*i_avg, where:
p is the interval,
QD is the average one way queuing delay experienced by packets in the flow sent from the first endpoint to the second endpoint according to the feedback received from the second endpoint during the last update interval p,
QD_max is the maximum one way queuing delay experienced by the flow so far,
beta is set between 0.5 and 1,
T_w is the time it takes to transition from loss-mode to delay-mode and vice versa,
i_last is a number of packets received by the second endpoint since a last packet loss based on the feedback received from the second endpoint, and
i_avg is the average number of packets received between two packet losses by the second endpoint in a time period based on the feedback received from the second endpoint.

15. The apparatus of claim 11, wherein the processing unit being operative to periodically update comprises the processing unit being operative to set x(t) =0.95*x(t), if, during the last interval, QD>beta*QD_max, w<0.8, time_full(t)>5 sec., and rand(1)<threshold(t), where:

QD is the average one way queuing delay experienced by packets in the flow sent from the first endpoint to the second endpoint according to the feedback received from the second endpoint during the last update interval p,
QD_max is the maximum one way queuing delay experienced by the flow so far,
beta is set between 0.5 and 1,
x(t) is the target sending rate, and
rand(1) is a random number between [0 . . . 1].

16. A non-transitory computer-readable medium that stores a set of instructions which when executed perform a method, the method executed by the set of instructions comprising:
initializing a weighting factor w, wherein initializing the weighting factor comprises setting w=1;
sending a flow from a first endpoint to a second endpoint at a target sending rate being a function of an extended price function, the extended price function being a function of the weighting factor, a delay-based price function, and a loss-based price function wherein the weighting factor weights the effect of the delay-based price function and the loss-based price function on the extended price function, wherein the extended price function comprises:

$$\text{extended\_price} = w * \text{price\_}D(t) + \text{gamma} * (1-w) * \text{price\_}L(t); \text{ where}$$

w is the weighting factor that varies between 0 and 1 inclusively,
price_D(t) is the delay-based price function,
price_L(t) is the loss-based price function, and
gamma is a constant scaling factor; and
periodically updating, at an interval, the weighting factor and the target sending rate at which the flow is being sent to the second endpoint based on the updated weighting factor, a previous value of the target sending rate, and feedback received from the second endpoint.

17. The non-transitory computer-readable medium of claim 16, wherein periodically updating comprises setting w=0 if losses were experienced by the flow during the last interval.

18. The non-transitory computer-readable medium of claim 16, wherein periodically updating comprises setting w=max(w−p/T_w, 0), if, during the last interval, QD>alpha*QD_max, where:
p is the interval,
QD is the average one way queuing delay experienced by packets in the flow sent from the first endpoint to the second endpoint according to the feedback received from the second endpoint during the last update interval p,
QD_max is the maximum one way queuing delay experienced by the flow so far,
alpha is set between 0.5 and 1, and
T_w is the time it takes to transition from loss-mode to delay-mode and vice versa.

19. The non-transitory computer-readable medium of claim 16, wherein periodically updating comprises setting w=min(w+p/T_w, 1), if, during the last interval, QD<beta*QD_max or i_last>8*i_avg, where:
p is the interval,
QD is the average one way queuing delay experienced by packets in the flow sent from the first endpoint to the second endpoint according to the feedback received from the second endpoint during the last update interval p, QD_max is the maximum one way queuing delay experienced by the flow so far, beta is set between 0.5 and 1, T_w is the time it takes to transition from loss-mode to delay-mode and vice versa, i_last is a number of packets received by the second endpoint since a last packet loss based on the feedback received from the second endpoint, and i_avg is the average number of packets received between two packet losses by the second endpoint in a time period based on the feedback received from the second endpoint.

20. The non transitory computer-readable medium of claim 16, wherein periodically updating comprises setting $x(t)=0.95*x(t)$, if, during the last interval, $QD>beta*QD\_max$, $w<0.8$, $time\_full(t)>5$ sec., and $rand(1)<threshold(t)$, where:

QD is the average one way queuing delay experienced by packets in the flow sent from the first endpoint to the second endpoint according to the feedback received from the second endpoint during the last update interval p, QD_max is the maximum one way queuing delay experienced by the flow so far, beta is set between 0.5 and 1, x(t) is the target sending rate, and rand(1) is a random number between [0 . . . 1].

* * * * *